(12) United States Patent
Aaltonen et al.

(10) Patent No.: US 7,236,771 B2
(45) Date of Patent: Jun. 26, 2007

(54) BROADCAST NETWORK

(75) Inventors: Janne Aaltonen, Turku (FI); Juha Salo, Littoinen (FI)

(73) Assignee: Nokia Corporation, Espoo (FI)

( * ) Notice: Subject to any disclaimer, the term of this patent is extended or adjusted under 35 U.S.C. 154(b) by 1021 days.

(21) Appl. No.: 09/893,418

(22) Filed: Jun. 29, 2001

(65) Prior Publication Data

US 2002/0023264 A1 Feb. 21, 2002

(30) Foreign Application Priority Data

Jun. 30, 2000 (GB) ................................. 0016065.5

(51) Int. Cl.
*H04Q 7/20* (2006.01)
(52) U.S. Cl. ................. 455/414.1; 455/3.01; 455/3.06; 725/87
(58) Field of Classification Search ................ 725/110, 725/123, 87, 62; 455/456.1, 456.2, 456.3, 455/456.5, 3.02, 3.04, 3.05, 3.06, 404.2, 455/414.2, 433, 435; 340/905, 901, 907; 348/14.01
See application file for complete search history.

(56) References Cited

U.S. PATENT DOCUMENTS 5,586,121 A * 12/1996 Moura et al. ............... 370/404

FOREIGN PATENT DOCUMENTS

| EP | 804012 | 10/1997 |
|---|---|---|
| EP | 813302 | 12/1997 |
| GB | 2313981 | 12/1997 |
| WO | 99/14775 | 3/1999 |
| WO | 99/33076 | 7/1999 |

OTHER PUBLICATIONS

DVB Document A025, May 1997, DVB Digital Video Broadcasting, Guideline for Implementation and Use of the Common Interface for DVB Decoder Applications, pp. 1-50.
DVB Document A017, May 1996, DVB Digital Video Broadcasting, Common Interface Specification for Conditional Access and Other Digital Video Broadcasting Decoder Applications, pp. 1-90.
UK Search Report.

* cited by examiner

*Primary Examiner*—Jean Gelin
(74) *Attorney, Agent, or Firm*—Banner & Witcoff, Ltd.

(57) ABSTRACT

A broadcast network 1 is described in which to improve network efficiency and quality of service, a particular transmitter 11*a* within the network 1 is selected to transmit content to a particular, preferably mobile terminal 3. The selection of the transmitter 11*a* is carried out by reference to information available in a second network 27, the user of the terminal 3 having a further terminal 12 connected to the second network 27 and either integrated with or in close proximity to their mobile terminal 3.

27 Claims, 3 Drawing Sheets

BROADCAST NETWORK

BACKGROUND OF THE INVENTION

1. Field of the Invention

The present invention relates to the delivery of content over a broadcast network, particularly although not exclusively a broadband digital broadcast network.

2. Description of the Prior Art

Broadband digital broadcast networks are known in which video and audio data are transmitted to a users equipped with suitable receivers. One such well known network is the terrestrial Digital Video Broadcasting (DVB-T) system found in Europe and elsewhere where the video and audio data comprises a plurality of channels allowing the user to select from a range of content. It has also been proposed to utilize such networks not only for the transmission of video and audio data but also for the delivery of more general data types including TCP/IP data traffic.

The delivery of more general data types such IP data as may differ from the typical delivery of video and audio data in that rather than the network operator providing the same content to all users (broadcast), a specific user (unicast) or group of users (multicast) may require specific content. In order to deal with such a range or transmission scenarios, the addressing of content using conditional access has been proposed. Conditional access adds a unique, usually encrypted, identifier to content such that only a receiving terminal with the relevant decryption capability can receive the content.

Further details of Conditional Access in relation to DVB can be found in the following ETSI Publications DVB-CI Common Interface Specification for Conditional Access and other Digital Video Broadcasting Decoder Applications EN50221 (V1:02/97) and Guidelines for Implementation and Use of the Common Interface for DVB Decoder Applications R 206 001 (V1: 1998) A025 (5/97).

However, although conditional access allow the addressing of an individual terminal or, indeed a group of terminals, it nevertheless remains necessary to transmit content using all the transmitters in the network irrespective of whether the content is included in a broadcast, multicast, or unicast.

SUMMARY OF THE INVENTION

According to a first aspect of the invention, there is provided a method for locating a terminal for delivery of content in a broadcast network comprising: associating the terminal with a transmitter operable in another network; interrogating the another network to determine the location of the transmitter; and delivering the content to the terminal at the location of the transmitter.

According to a second aspect of the invention, there is provided a system for delivering content to a terminal in a broadcast network, the system comprising at least one terminal in a broadcast network, the terminal being associated with a transmitter in another network, wherein the broadcast network includes a processor operable to interrogate the another network to determine the location of the transmitter and thereby deliver content to the terminal at the determined location.

According to a third aspect of the invention, there is provided an apparatus for delivering content to a terminal in a broadcast network comprising a processor operable to interrogate another network to determine the location of a transmitter associated with the terminal and deliver content to the terminal at the determined location.

The another network may be a public land mobile network. In which case, the transmitter associated with the terminal may be a mobile station. Thus, the terminal may be associated with a mobile station in the control of a single user. Consequently, the another network might make available, at the request of the user, location details relating to the mobile station to the broadcast network.

According to another aspect of the invention, there is provided head end apparatus for use in a first multi-transmitter broadcast network, the apparatus comprising a terminal locator operable in response to a request to deliver content to a terminal in the first network to obtain terminal location information from a second, different network, a memory having stored therein transmitter location information and a controller operable in response to the request to transmit content to determine from the terminal and transmitter location information a suitable transmitter to deliver the content to the terminal.

Advantageously, as a result of the more effective utilization of the transmitter network there is an improvement in service quality and spectral efficiency of the network. Such an improvement arises in the first case because the network can select a transmitter which meets the particular reception requirements for the terminal receiving that content. Thus, where it is known that in a particular area there exist terrain features, for example, which dictate against the use of one transmitter in favor of another, this information could be used in selecting a transmitter to transmit to a terminal in that area. In the second case, the ability to select a particular transmitter means that the frequencies previously used by the other transmitters to deliver that content are freed for other purposes. The apparatus may further include a router to route content to the suitable transmitter. The router may be responsive to data stored with content to be transmitted identifying the suitable transmitter.

According to another aspect of the invention, there is provided a terminal for use with a first multi-transmitter broadcast network, including a receiver operable to receive content transmitted by a selected one of a plurality of transmitters of the first network and a further transmitter connected to a second network from which the first network derives information relating to the location of the further transmitter to facilitate selection of the one transmitter.

Conveniently, the further transmitter is integrated in the terminal. In this way, the user can be certain that the content will be delivered to the correct location. Alternatively, the terminal may include an interface to permit connection to an external transmitter such as a mobile station of a cellular network. In either case, the further transmitter may also be used to provide a back or return channel which could be used to acknowledge delivery of content to the terminal and might also be used to make requests for content. Where no such acknowledgement ability exists, the assumption is, of course, that the further transmitter is reasonably certain to be co-located with the terminal. Furthermore, a profile might be established for each terminal user which could be consulted by a service provider desirous of delivering content to terminals of users likely to be interested in the content According to still further aspect of the invention, there is provided a system for delivering content to a mobile terminal comprising a first broadcast network having a plurality of transmitters, and at least one terminal, the terminal having a receiver for receiving content from the first network, and in proximity thereto a further transmitter connected to a second network from which the first network derives information relating to the location of the further transmitter, wherein the selection of a transmitter to deliver content to the terminal is made in accordance with the location information.

While according to another aspect of the invention there is provided a method of delivering content using a suitable transmitter of a first broadcast network to a first terminal in proximity to a second terminal of a second network comprising deriving location information relating to the second terminal from the second network and utilizing that information in the selection of a suitable transmitter.

The selection of a suitable transmitter is preferably made based on the coverage pattern or footprint of the transmitter. Advantageously, where the position of the second terminal is insufficiently well defined to enable the selection of a particular transmitter from a plurality of potential suitable transmitters, delivery of the content is attempted via each of the potential transmitters in turn.

BRIEF DESCRIPTION OF THE DRAWINGS

In order to aid in understanding the present invention, a particular embodiment thereof will now be described by way of example and with reference to the accompanying drawings, in which.

DETAILED DESCRIPTION OF THE INVENTION

Figure 1:
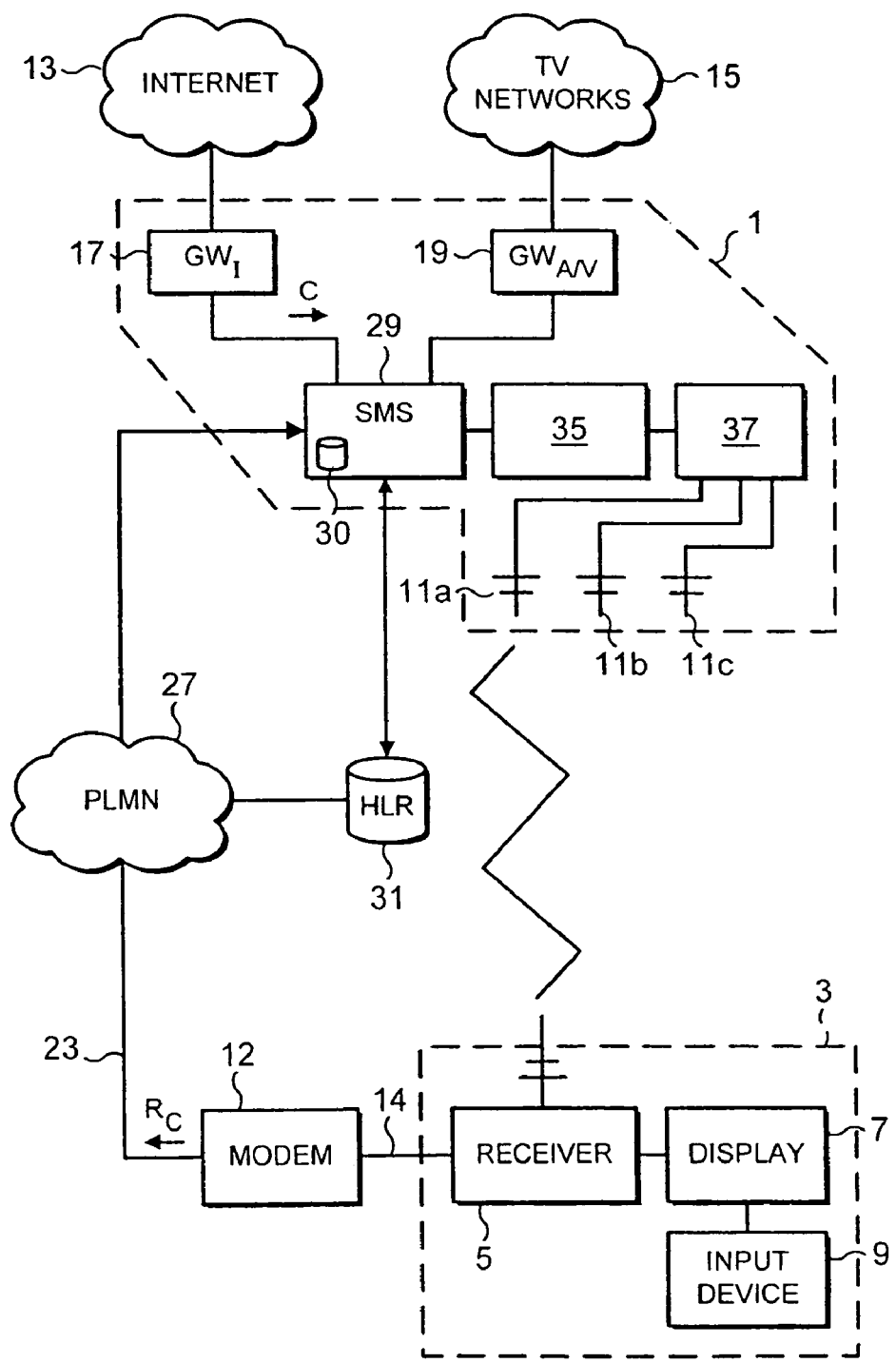
FIG. 1 is a diagrammatic view of a digital broadcast network according to an embodiment of the present invention.

Referring to FIG. 1, this shows a terrestrial digital video broadcast (DVB-T) network 1 having a plurality of transmitters 11a, 11b, 11c. A user equipped with a suitable Digital Receiver (DR) hereinafter referred to as a terminal 3 incorporating a receiver 5, display 7 and user interface 9, can receive data broadcast by the network 1 from a transmitter 11 forming part of the network 1. The data broadcast by the transmitter 11 is derived from a variety of sources 13,15 via gateways 17,19 and may respectively include TCP/IP, datagrams (UDP/IP) and Television content. Furthermore, as is becoming increasingly common, the user is also in possession of a mobile station (MS) forming part of a Public Land Mobile Network (PLMN). The MS is interfaced with the terminal 3 over an infrared link 14.

Before transmission, the data received from a source 13,15 is processed in head-end equipment. As is well known in the art, the head end equipment places the data into MPEG-based data containers. To cater for the delivery of data to a particular terminal or group of terminals, the containers may a iso hold address information which can be identified and read by a conditional access component in the terminal to determine whether the data is intended for that terminal. The network 1 also provides the facility for suitably equipped terminals 3 to interact with the network 1. Thus, a user may request the delivery of a computer file via the network 1 to his or her terminal 3. Such functionality requires a return channel 23 from the terminal 3 to the DVB-T network 1 and a conditional access component in the terminal 3. The return channel 23 can be provided in the form of a dial-up connection using a modem function of the MS 12. The MS 12 which is connected to the terminal 3, establishes a connection over a telecommunications network 27 such as a PLMN and/or PSTN 27 to a subscriber management system (SMS) 29 (shown externally of network 1 for clarity only) of the DVB-T network 1. The subscriber management system 29 has connections to both the gateways 17,19 and the transmitter head-end equipment. It is thus possible for the user to issue a request for specific content via the user interface 9 of the terminal 3. The request is received by the SMS 29 which obtains the content from the relevant gateway 17,19 and passes it to the transmitter head-end for placing into data containers for onward transmission. It should be noted that the request from the user might include a request for content which is not presently being transmitted by the network 1. To ensure that the user only receives the requested content, the data is broadcast with an identifier which the conditional access component in the terminal 3 recognizes as being intended for delivery to the user. In the event that the content is received by another terminal, the conditional access component of that terminal will prevent delivery of the content.

Figure 2:
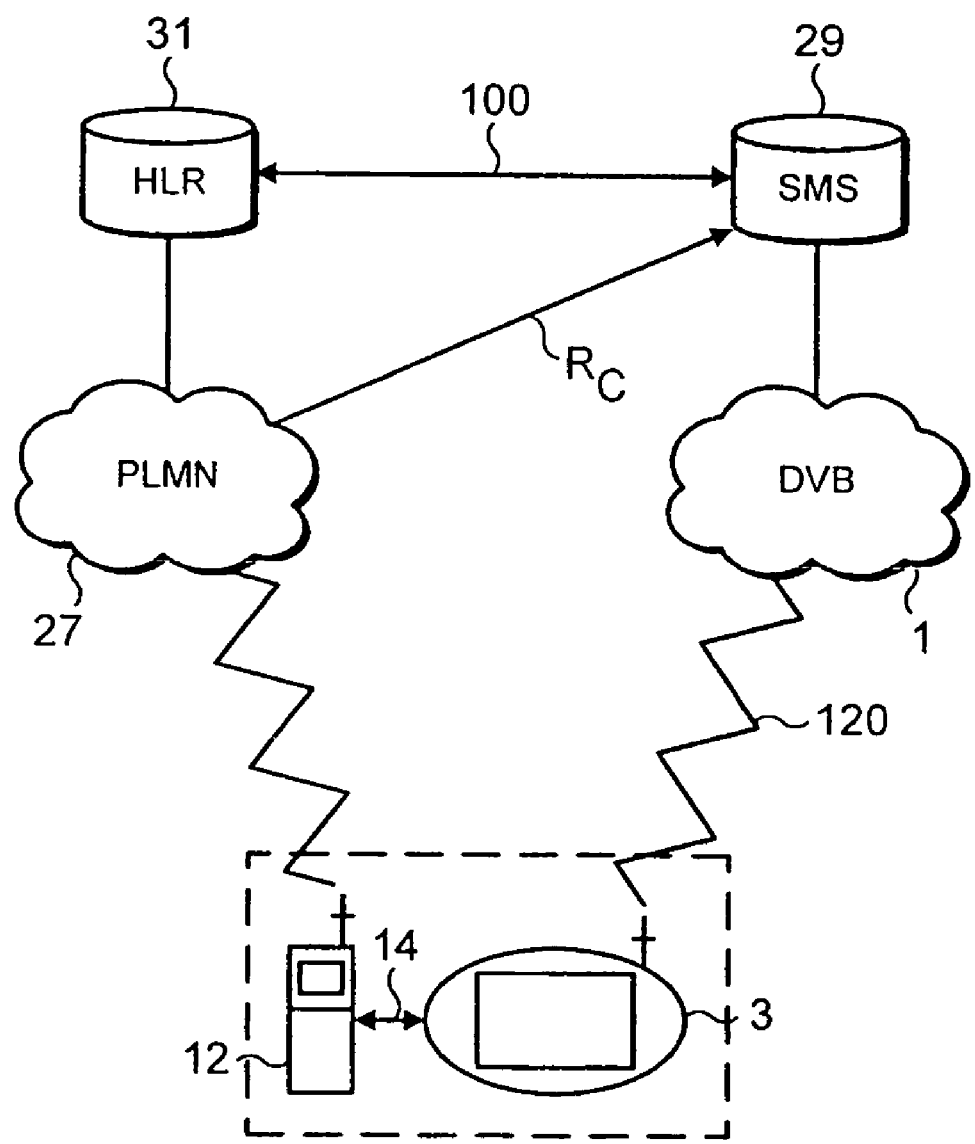
FIG. 2 is a more detailed diagrammatic view of the network of FIG. 1.

In the situation illustrated in the FIG. 2, a user has requested via his or her return channel 23 a specific item of content $R_C$. The return channel 23 in this instance is provided by the MS 12 connected, in use, to the PLMN 27. In this instance, the user has requested using his or her terminal 3, a webpage made up of textual and graphical material, although the request could have been for a particular channel of television content. The request $R_C$ from the user is passed via the IR link 14 to the MS 12 which connects via the PLMN 27 to the SMS 29 of the broadcast network 1, where it is identified as being a request for Internet content. The SMS 29 passes the request to the appropriate gateway, in this case the Internet gateway 17. This gateway 17 processes the request $R_C$ and retrieves the requested content C, from the Internet. The content C, which, as has already been explained, is made up of textual and graphical elements, is returned to the SMS 29. In the meantime, the SMS 29 attempts to identify firstly whether the terminal 3 for which the content is intended is mobile or fixed. Thus, the SMS 29 queries a database 30 to obtain a user profile for the user identified in the request $R_C$. If the terminal 3 is found to be fixed, then the content will be broadcast in the known manner. Otherwise, the SMS 29 seeks to determine from the request $R_C$ whether it originated in the terminal 3 itself or from another external source such as a push from an advertiser or the like. Should the SMS 29 determine that the request $R_C$ has come from the terminal 3, then the SMS 29 will attempt to determine the calling line identity (CLI) of the MS 12 sending the request $R_C$. If the CLI is not available or alternatively the request originated externally as a push, the SMS 29 retrieves a mobile telephone number of a MS, which number has previously been supplied by the user for storage in the user profile.

Figure 3:
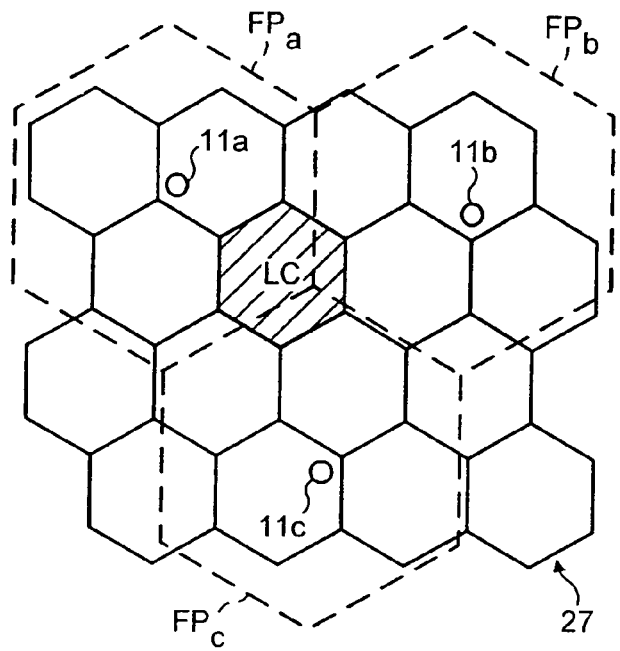
FIG. 3 is schematic view illustrative of part of the method according to the invention.
Figure 4:
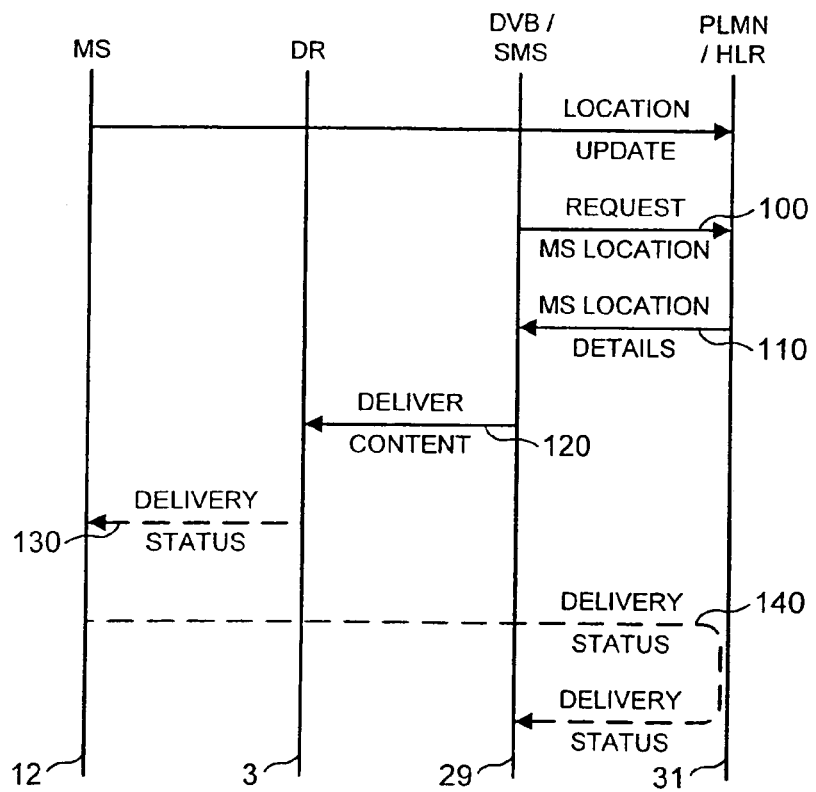
FIG. 4 is a diagrammatic plan view of a transmitter coverage pattern generated by the network of FIG. 1.

Referring particularly to FIGS. 3 and 4, these illustrate the coverage patterns and overlap of individual transmitters of a digital broadcast network (chain lines) and base stations of a Public Land Mobile Network (solid lines). Once the SMS has determined a number, a direct connection is then established to a Home Location Register (HLR) 31 of a Public Land Mobile Network (PLMN) 27 identified as being the home network of the number found by the SMS 29. In response to a request 100 from the SMS 29, the PLMN 27 provides 110 an indication, if available, of the latest cell (LC) (shown hatched in FIG. 3) in which the MS 12 corresponding to that identified from the CLI or failing that the number stored in the user profile is located. The SMS 29 passes the latest cell indication returned by the HLR 31 together with the retrieved content C to a transmitter mapper 35. The transmitter mapper 35 identifies a transmitter 11a from those in the network 1 whose footprint (FP) includes most, if not all, of the latest cell (LC) identified by the HLR 31. The mapper 35 may carry out the identification of the most suitable transmitter using a look-up table in which cells of the PLMN 27 are cross-referenced with a suitable transmitter, for example. This information is then attached to the content C, the latter having been encrypted as an MPEG-2 data stream before both the transmitter and content information are passed to a router 37. The router 37 retrieves the information identifying the transmitter assigned to the content C by the transmitter mapper and passes the content C it to the appropriate transmitter 11a for transmission 120. The user's terminal 3, which hopefully has remained within the footprint $FP_a$ of the transmitter, is then able to receive the content C.

Optionally, where the terminal 3 is provided with a return channel 23 via the MS 12, this can be utilized in the generation of a delivery status report 130. Such an acknowledgement is not, however, a requirement, it being assumed with a reasonable probability that a user will be carrying her MS 12 along with her terminal 3. However, where acknowledgement is possible and desirable, the status report 130 is passed 140 over the return channel 23 via the PLMN 27 to the SMS 29 and contains confirmation of whether the content C has reached the terminal 3 successfully. Where the request $R_C$ was originated in the terminal 3 and in the event that the content C does not reach the terminal 3 within a pre-determined period, the terminal 3 will generate a report indicating that no delivery has taken place. Otherwise, where the request was originated in the terminal 3 and their followed successful reception of the content C, a corresponding report will be made. In the event that the SMS 29 receives a report of unsuccessful delivery, then the SMS 29 will first attempt to re-send the content C. Thus, the SMS 29 will first update the MS 12 location from the HLR 31. Should this update reveal that the MS 12 remains in the same cell, it may be that the MS 12 is within a region of the cell covered by a different transmitter footprint FP. Thus, while the update continues to indicate the same location cell, the SMS 29 will instruct the mapper 35 to provide details of each transmitter covering at least part of that cell so that content C may be sent by that transmitter. Otherwise, if the terminal has moved to a cell covered by a different transmitter footprint FP, that transmitter 11 will be used to deliver the content. However, in the event that the above described resending of content fails after a pre-determined number attempts, the content will be transmitted over all the transmitters in the network.

In another embodiment of the invention, particularly suitable to a situation where the overlap of the transmitter footprints FP do not correspond closely to the underlying cell structure of the PLMN 27, a different method of obtaining the location of the MS 12 is employed. In this case, instead of the SMS 29 obtaining the latest cell information from the HLR 31, the SMS 29 requests the PLMN 27 to carry out a location update using a more precise positioning method such as base station triangulation or GPS. Particularly in the case where a MS 12 is located in a cell LC which is covered by separate transmitter footprints FP, the more accurate positioning information obtained in this way should allow the transmitter mapper 35 to direct the content C to the transmitter most likely to deliver the content to the terminal 3.

It will be further appreciated that the terminal 3 may incorporate a mobile station 12 rather than rely on the presence of an MS 12 in close proximity to the terminal 3 to provide the location information. By having the MS 12 incorporated in the same housing as the terminal 3, the user would both have less items of equipment to carry and also could be assured that the terminal 3 was always co-located with the mobile station 12 or, indeed another communications device which provides the positioning information for use by the network. In addition, the integrated MS 12 could be employed to provide a return channel 23 in the same manner that an independently carried MS 12 could be interfaced to the terminal 3 to facilitate the option of a return channel 23.

Furthermore, it will be clear that although in the above embodiment the Return Channel 23 is provided over the same network, namely the PLMN 27, as is used to derive the location information, a separate return channel using a different bearer could be employed. Indeed, as has already been stated, the request for content need not originate with the terminal 3. For example, an advertiser or service provider may wish to push particular content to a certain user or group of users perhaps located in a certain area relevant to the content being pushed.

What is claimed is:

1. A method for providing content, comprising the steps of:
    receiving a user request for content at a digital broadcast video receiver terminal;
    transmitting a wireless request corresponding to said user request via wireless transmission to a cellular telephone proximate to said terminal;
    transmitting a cellular request corresponding to said wireless request by said cellular telephone to a mobile network;
    said mobile network obtaining a phone number for said cellular telephone using said cellular request, accessing a home location register based on said phone number, and identifying a cell in which said cellular telephone was most recently located based on said phone number;
    using said cell identity to identify one or more digital video broadcast transmitters having a coverage footprint that overlaps said cell; and
    transmitting said requested content to said terminal using said identified one or more digital video broadcast transmitters.

2. The method of claim 1, wherein said wireless transmission is an infrared transmission.

3. The method of claim 1, further comprising:
    receiving an indication that said transmitted requested content was not successfully received at said terminal, and in response, second attempting to deliver the requested content to said terminal using more digital video broadcast transmitters than were used in said step of transmitting said requested content.

4. The method of claim 1, further comprising:
    receiving an indication that said transmitted requested content was not successfully received at said terminal, and in response, second attempting to deliver the requested content to said terminal using one or more digital video broadcast transmitters different from the one or more digital video broadcast transmitters that were used in said step of transmitting said requested content.

5. The method of claim 1, further comprising said cellular telephone receiving a delivery status report via said mobile network regarding the requested content.

6. The method of claim 1, wherein said requested content comprises a web page.

7. A method, comprising:
wirelessly receiving, at a cellular telephone, a user request for content from a digital broadcast video receiver terminal located proximate to said cellular telephone; and
transmitting a cellular request corresponding to said user request to a mobile network, wherein said request causes said network to:
obtain a phone number for said cellular telephone using said cellular request;
access a home location register based on said phone number;
identify a cell in which said cellular telephone was most recently located based on said phone number;
use said cell identity to identify one or more digital video broadcast transmitters having a coverage footprint that overlaps said cell; and
request said identified one or more transmitters to transmit said requested content to said receiver terminal.

8. The method of claim 7, wherein said wirelessly receiving said user request is performed using an infrared receiver.

9. The method of claim 7, further comprising said cellular telephone receiving a delivery status report via said mobile network regarding the requested content.

10. The method of claim 7, wherein said requested content comprises a web page.

11. A cellular telephone, comprising:
means for receiving a user request for content at a digital broadcast video receiver terminal;
means for transmitting a wireless request corresponding to said user request via wireless transmission to a cellular telephone proximate to said terminal; and
means for transmitting a cellular request corresponding to said wireless request by said cellular telephone to a mobile network, said cellular request causing said mobile network to:
obtain a phone number for said cellular telephone using said cellular request, access a home location register based on said phone number, and identify a cell in which said cellular telephone was most recently located based on said phone number;
use said cell identity to identify one or more digital video broadcast transmitters having a coverage footprint that overlaps said cell; and
transmit said requested content to said terminal using said identified one or more digital video broadcast transmitters.

12. The cellular telephone of claim 11, wherein said means for receiving a user request is an infrared receiver.

13. The cellular telephone of claim 11, further comprising means for receiving a delivery status report via said mobile network regarding the requested content.

14. The system of claim 11, wherein said requested content comprises a web page.

15. A cellular telephone comprising:
an antenna; and
a modem, said cellular telephone being configured to:
wirelessly receive a user request for content from a digital broadcast video receiver terminal located proximate to said cellular telephone; and
transmit a cellular request corresponding to said user request to a mobile network, wherein said request causes said network to:
obtain a phone number for said cellular telephone using said cellular request;
access a home location register based on said phone number;
identify a cell in which said cellular telephone was most recently located based on said phone number;
use said cell identity to identify one or more digital video broadcast transmitters having a coverage footprint that overlaps said cell; and
request said identified one or more transmitters to transmit said requested content to said receiver terminal.

16. The cellular telephone of claim 15, further comprising an infrared receiver configured to wirelessly receive said user request as an infrared signal.

17. The cellular telephone of claim 15, further configured to receive a delivery status report via said mobile network regarding the requested content.

18. The cellular telephone of claim 15, wherein said requested content comprises a web page.

19. A content delivery system, comprising:
a network configured to:
receive a cellular request from a cellular telephone, said request corresponding to a user request wirelessly received by said cellular telephone from a digital broadcast video receiver terminal located proximate to said cellular telephone;
obtain a phone number for said cellular telephone using said cellular request;
access a home location register based on said phone number;
identify a cell in which said cellular telephone was most recently located based on said phone number;
use said cell identity to identify one or more digital video broadcast transmitters having a coverage footprint that overlaps said cell; and
request said identified one or more transmitters to transmit said requested content to said receiver terminal.

20. The system of claim 19, said network being further configured to:
receive an indication that said requested content was not successfully received at said terminal, and in response, make a second request to deliver the requested content to said terminal using more digital video broadcast transmitters than said identified one or more transmitters.

21. The system of claim 19, said network being further configured to:
receive an indication that said requested content was not successfully received at said terminal, and in response, make a second request to deliver the requested content to said terminal using one or more digital video broadcast transmitters different from said identified one or more transmitters.

22. A method for providing content, comprising:
receiving a cellular request from a cellular telephone, said request corresponding to a user request wirelessly received by said cellular telephone from a digital broadcast video receiver terminal located proximate to said cellular telephone;
obtaining a phone number for said cellular telephone using said cellular request;
accessing a home location register based on said phone number;
identifying a cell in which said cellular telephone was most recently located based on said phone number;
using said cell identity to identify one or more digital video broadcast transmitters having a coverage footprint that overlaps said cell; and transmitting said requested content to said receiver terminal using said identified one or more transmitters.

23. The method of claim 22, wherein said user request is wirelessly received as an infrared transmission.

24. The method of claim 22, further comprising said cellular telephone receiving a delivery status report via said mobile network regarding the requested content.

25. The method of claim 22, wherein said requested content comprises a web page.

26. The method of claim 22, further comprising:
receiving an indication that said requested content was not successfully received at said terminal, and in response, making a second request to deliver the requested content to said terminal using more digital video broadcast transmitters than said identified one or more transmitters.

27. The method of claim 22, further comprising:
receiving an indication that said requested content was not successfully received at said terminal, and in response, making a second request to deliver the requested content to said terminal using one or more digital video broadcast transmitters different from said identified one or more transmitters.

* * * * *